United States Patent [19]

Hanyu et al.

[11] Patent Number: 5,523,872
[45] Date of Patent: Jun. 4, 1996

[54] PROCESS FOR ASSEMBLING A CHIRAL SMECTIC LIQUID CRYSTAL PANEL WITH A HOUSING THEREFOR

[75] Inventors: Yukio Hanyu, Atsugi; Masanobu Asaoka, Yokohama, both of Japan

[73] Assignee: Canon Kabushiki Kaisha, Tokyo, Japan

[21] Appl. No.: 200,461

[22] Filed: Feb. 23, 1994

Related U.S. Application Data

[60] Division of Ser. No. 834,987, Feb. 14, 1992, Pat. No. 5,293,544, which is a continuation-in-part of Ser. No. 813,768, Dec. 27, 1991, abandoned, which is a continuation of Ser. No. 489,338, Mar. 6, 1990, Pat. No. 5,109,294.

[30] Foreign Application Priority Data

Mar. 7, 1989 [JP] Japan .................................. 1-052878

[51] Int. Cl.⁶ .................................................... G02F 1/13
[52] U.S. Cl. .............................. 359/78; 359/83; 359/104
[58] Field of Search ................................. 359/78, 82, 83, 359/104, 100

[56] References Cited

U.S. PATENT DOCUMENTS

| | | | |
|---|---|---|---|
| 4,367,924 | 1/1983 | Clark et al. | 350/334 |
| 4,639,089 | 1/1987 | Okada et al. | 350/341 |
| 4,674,839 | 6/1987 | Tsuboyuma et al. | 350/334 |
| 4,820,026 | 4/1989 | Okada et al. | 350/341 |
| 4,838,663 | 6/1989 | Lagerwall et al. | 350/350 S |
| 4,883,344 | 11/1989 | Okada et al. | 350/339 R |
| 4,906,074 | 3/1990 | Yamazaki et al. | 350/350 S |
| 4,932,758 | 6/1990 | Hanyu et al. | 350/350 S |
| 5,005,953 | 4/1991 | Kawagishi | 350/341 |
| 5,046,823 | 9/1991 | Mori et al. | 359/56 |
| 5,078,477 | 1/1992 | Jono et al. | 359/91 |
| 5,109,294 | 4/1992 | Hanyu et al. | 359/83 |
| 5,124,827 | 6/1992 | Davey | 359/100 |
| 5,150,231 | 9/1992 | Iwamoto et al. | 359/83 |
| 5,151,804 | 9/1992 | Verhulst et al. | 359/56 |
| 5,164,852 | 11/1992 | Konuma | 359/76 |
| 5,270,847 | 12/1993 | Sano | 359/83 |
| 5,274,486 | 12/1993 | Yamazaki et al. | 359/83 |
| 5,293,544 | 3/1994 | Hanyu et al. | 359/83 |

FOREIGN PATENT DOCUMENTS

| | | | |
|---|---|---|---|
| 55-75679 | 6/1980 | Japan | 359/83 |
| 62-159120 | 7/1987 | Japan | 359/83 |
| 63-64022 | 3/1988 | Japan | 359/83 |

*Primary Examiner*—Rolf Hille
*Assistant Examiner*—Minhloan Tran
*Attorney, Agent, or Firm*—Fitzpatrick, Cella, Harper & Scinto

[57] ABSTRACT

A liquid crystal apparatus includes: (a) a liquid crystal panel having a longitudinal direction and containing therein a chiral smectic liquid crystal comprising plural layers of liquid crystal molecules aligned to have a common layer normal, each layer being composed of a plurality of liquid crystal molecules, each liquid crystal molecule being oriented to one of plural stable orientation states in the absence of an electric field; and (b) a panel supporting means comprising two fixing axes which extend in parallel with the longitudinal direction of the liquid crystal panel and fix the peripheral sides of the liquid crystal panel, the fixing axes forming an intersection angle $\theta_1$ in the range of 0–25 degrees with the common layer normal.

7 Claims, 11 Drawing Sheets

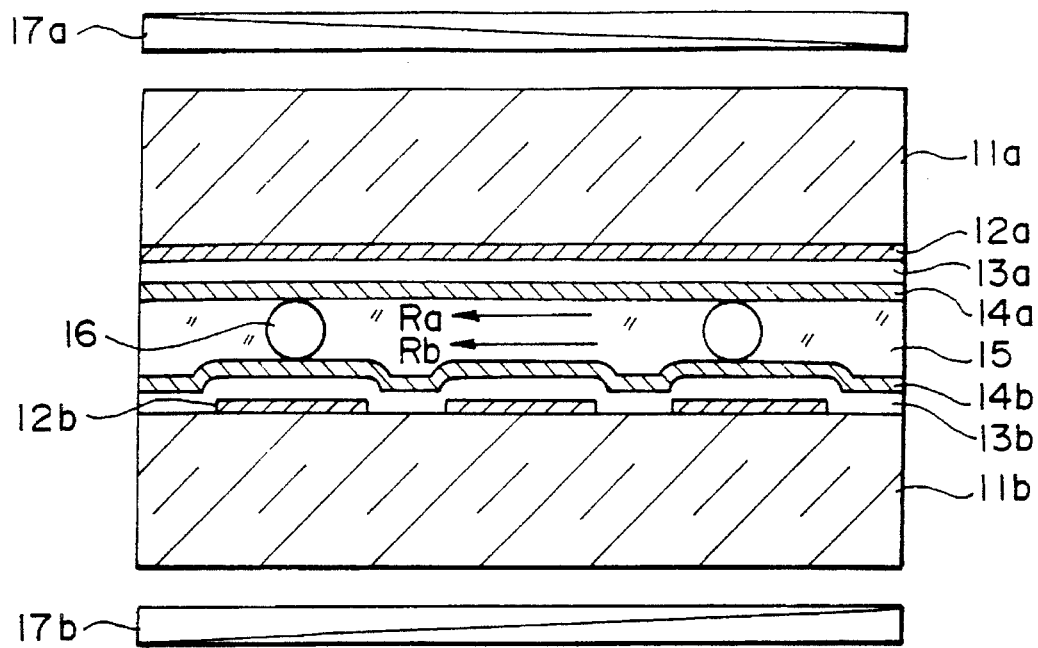
F I G. 1
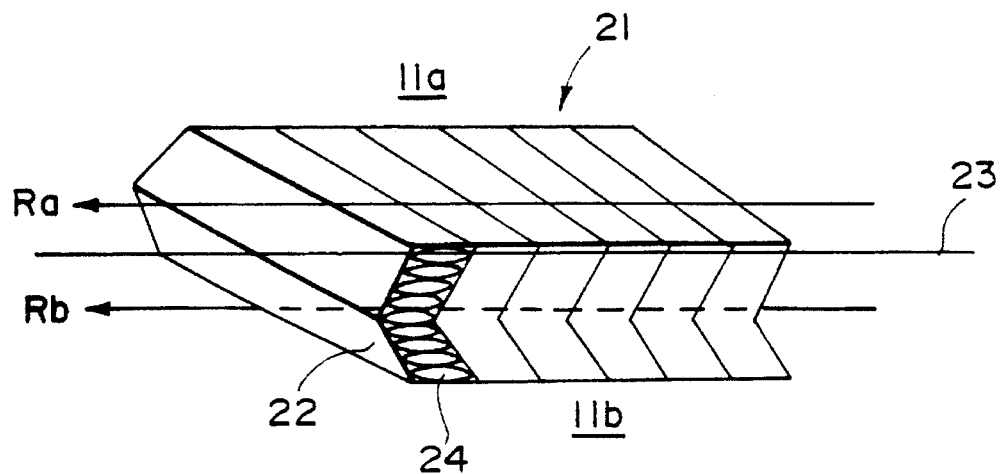
F I G. 2

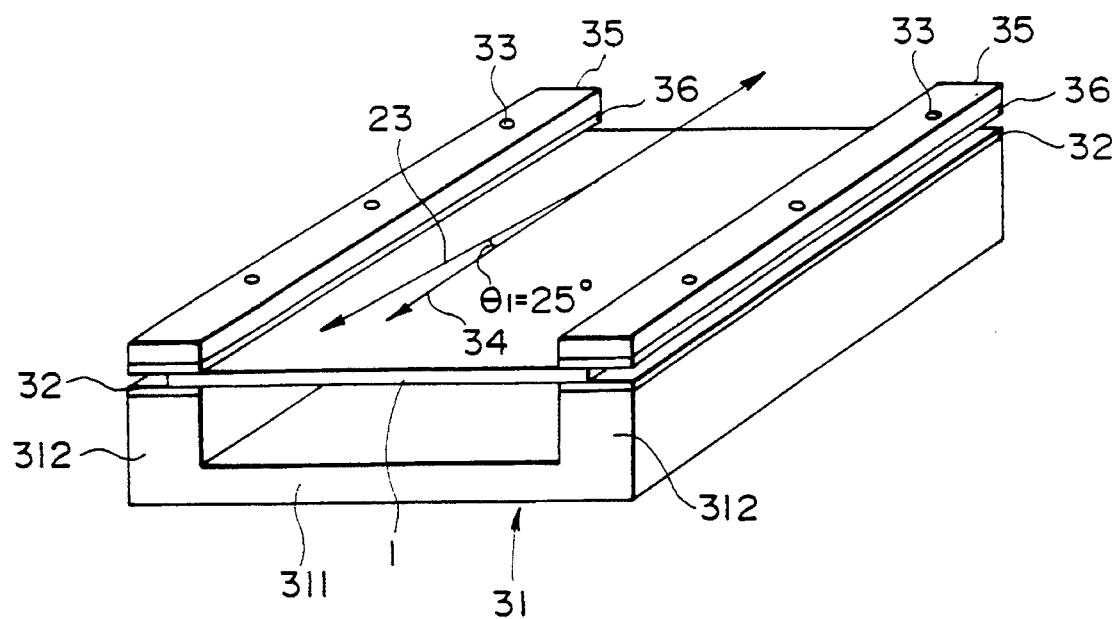
F I G. 4A
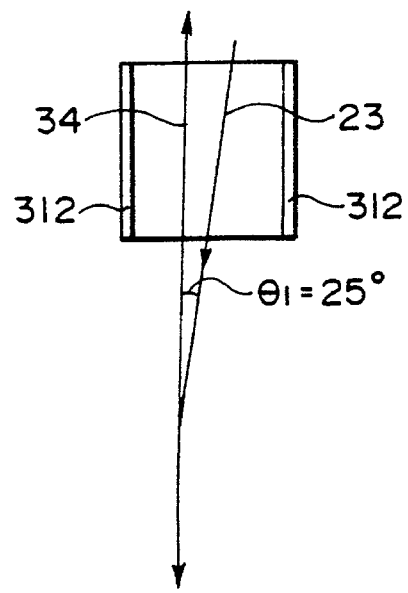
F I G. 4B

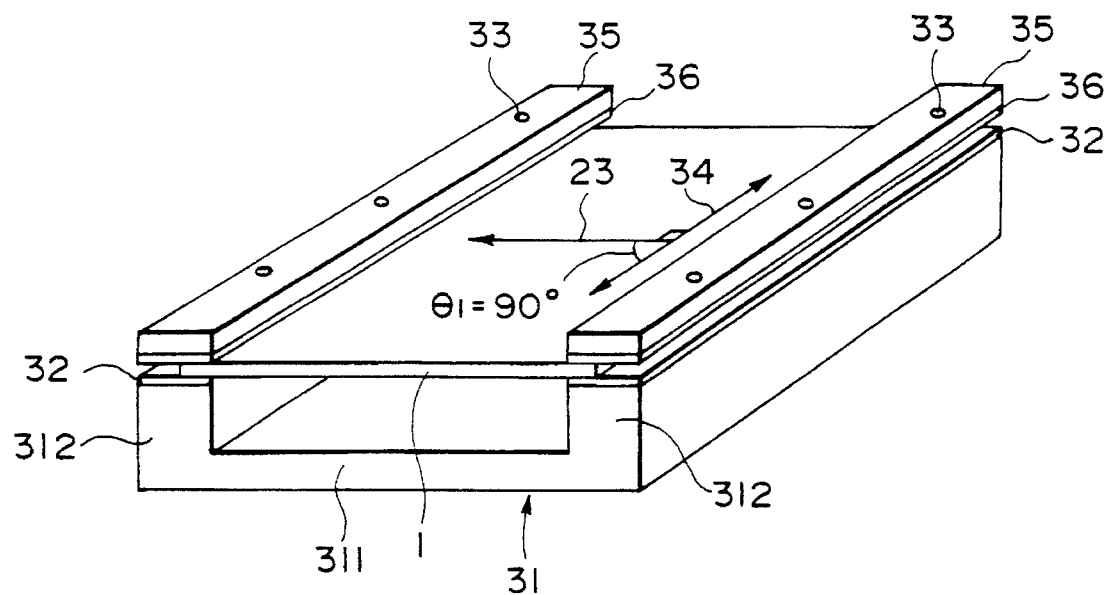
F I G. 5A
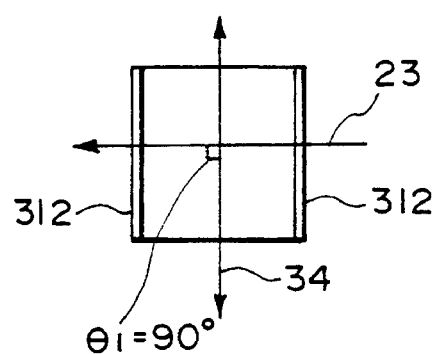
F I G. 5B

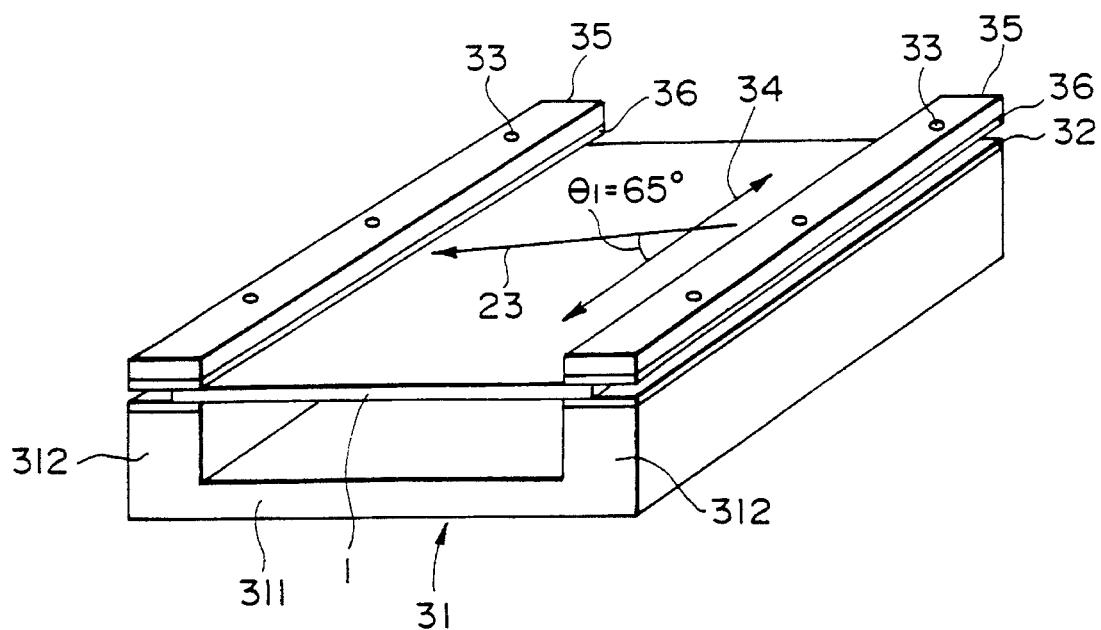
F I G. 6A
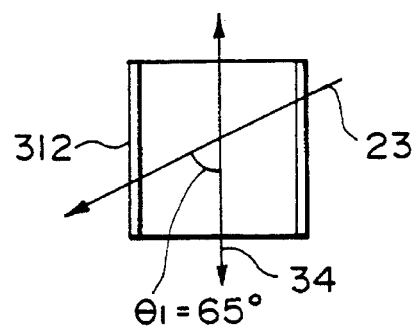
F I G. 6B

×200

×200

PROCESS FOR ASSEMBLING A CHIRAL SMECTIC LIQUID CRYSTAL PANEL WITH A HOUSING THEREFOR

This application is a division of application Ser. No. 07/834,987 filed Feb. 14, 1992, U.S. Pat. No. 5,293,544, which is a continuation-in-part of prior application Ser. No. 07/813,768 filed Dec. 27, 1991 now abandoned, which in turn is a continuation of prior application Ser. No. 07/489,338 filed Mar. 6, 1990 now U.S. Pat. No. 5,109,294.

FIELD OF THE INVENTION AND RELATED ART

The present invention relates to a liquid crystal apparatus for use in a display apparatus, a light bulb apparatus, etc., particularly such a liquid crystal apparatus using a chiral smectic liquid crystal.

Clark and Lagerwall have proposed a type of display device wherein the refractive index anisotropy of a chiral smectic liquid crystal is utilized and combined with a polarizer to control the transmission of light therethrough (U.S. Pat. No. 4,367,924, etc.). The chiral smectic liquid crystal shows a ferroelectricity in its chiral smectic C phase (SmC*) or H phase (SmH*) and assumes a helical alignment structure in its bulk state. If the liquid crystal at a temperature yielding the chiral smectic C phase or H phase inherently providing a helical alignment structure is disposed between a pair of substrates set to have a spacing therebetween small enough to suppress the formation of the helical alignment structure, the chiral smectic liquid crystal is placed in a biaxial orientation state in which the liquid crystal molecule is any or either one of a plurality of optically stable states including a first optically stable state and a second optically stable state depending on an electric field applied thereto. The liquid crystal further shows a memory characteristic that the molecule retains the resultant orientation state in the absence of an electric field and shows a high-speed responsive characteristic in response to a change in electric field, so that it is expected to be widely used in a high-speed and memory-type display device. In such an apparatus, a chiral smectic liquid crystal is composed of plural molecular layers each comprising a plurality of liquid crystal molecules and disposed vertically to the substrates, so that the plural molecular layer are uniformly aligned to have a single normal which generally aligns with a rubbing axis imparted to the substrates, as disclosed in U.S. Pat. No. 4,639,089.

In this instance, in order for an optical modulation device using such a chiral smectic liquid crystal in a bistable alignment state to exhibit the above-mentioned memory characteristic and high-speed responsiveness, it is necessary that the bistable alignment state is stably and uniformly retained in the device and the device is excellent in durability.

A chiral smectic liquid crystal device in the above-mentioned bistable alignment state comprises liquid crystal molecules in a highly ordered alignment state because of the uniformity of the alignment state. The highly ordered alignment state of the liquid crystal molecules is susceptible to external forces applied to a cell, such as impact and distortion, and the liquid crystal molecules under application of such external forces are disordered to result in, typically, a sanded texture. The occurrence of a sanded texture under application of an impact force has been reported by, e.g., U.S. Pat. No. 4,674,839 to A. Tsuboyama, et al.

SUMMARY OF THE INVENTION

An object of the present invention is to provide a liquid crystal apparatus having solved the above-mentioned problems, particularly a liquid crystal apparatus having a stabilized structure improved in durability against impact or distortion.

Another object of the present invention is to provide a liquid crystal apparatus having a stabilized structure capable of protecting the bistable or multistable alignment or orientation state of a chiral smectic liquid crystal from impact or distortion.

According to the present invention, there is provided a liquid crystal apparatus, comprising:

(a) a liquid crystal panel having a longitudinal direction and containing therein a chiral smectic liquid crystal comprising plural layers of liquid crystal molecules aligned to have a common layer normal, each layer being composed of a plurality of liquid crystal molecules, each liquid crystal molecule being oriented to one of plural stable orientation states in the absence of an electric field; and (b) a panel supporting means comprising two fixing axes which extend in parallel with the longitudinal direction of the liquid crystal panel and fix the peripheral sides of the liquid crystal panel, the fixing axes forming an intersection angle $\theta_1$ in the range of 0–25 degrees with the common layer normal.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a schematic sectional view of a chiral smectic liquid crystal cell (device) used in the present invention.

FIG. 2 is a schematic perspective illustration of a molecular layer structure used in the present invention.

FIGS. 3A and 4A are perspective views of apparatus according to the present invention, and FIGS. 3B and 4B are corresponding plan views.

FIGS. 5A and 6A are perspective views of apparatus outside the scope of the present invention, and FIGS. 5B and 6B are corresponding plan views.

DETAILED DESCRIPTION OF THE PREFERRED EMBODIMENTS

Figure 3A:
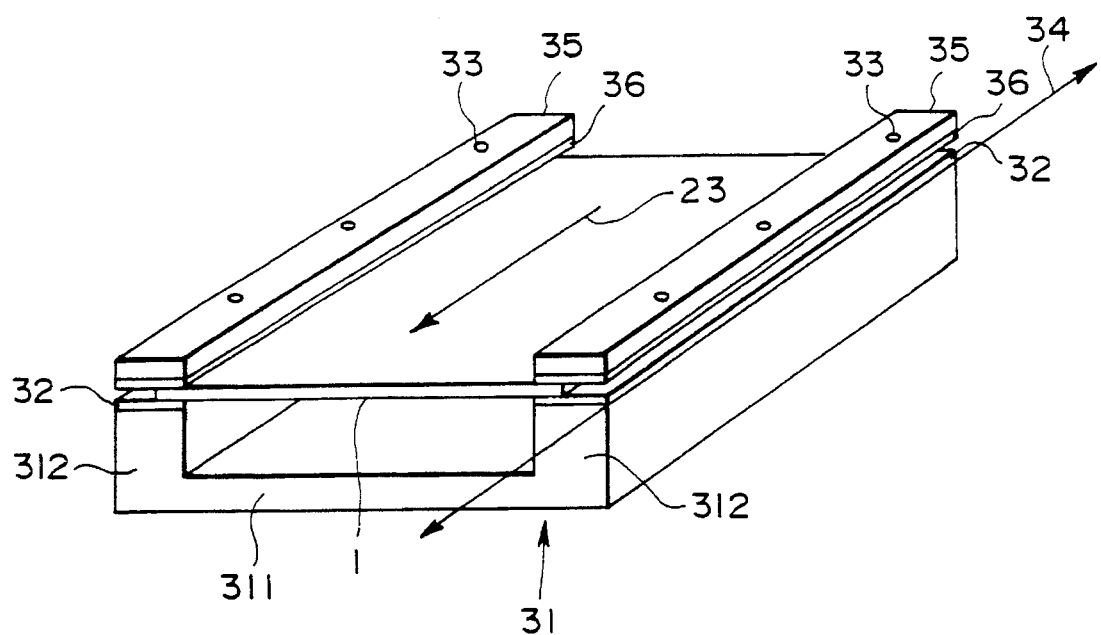

According to our study based on experiments regarding the above-mentioned problems, the following points have been found.

FIG. 1 schematically shows a type of a chiral smectic liquid crystal cell used in the experiments. A cell having the structure shown in the figure was supported according to the structure of the present invention and another structure, and the resultant apparatus were checked with respect to their strength or durability.

Referring to FIG. 1, the cell comprises substrates (glass plates) 11a and 11b coated with transparent stripe electrodes 12a and 12b of $In_2O_3$ and ITO (indium tin oxide) which are covered with 200 Å to 10000 Å-thick insulating films 13a and 13b of $SiO_2$, $TiO_2$, $Ta_2O_5$, etc., and 50 Å to 1000 Å-thick alignment control films 14 and 14b, respectively, of polyimide, polyamide, polyester, etc.

The alignment control films 14a and 14b have been respectively rubbed in the direction of an arrow Ra (the direction of stripe electrodes 12a, i.e., the lateral direction of the drawing) and in the direction of an arrow Rb (the direction perpendicular to the direction of the stripe electrodes 12b (extending in the direction perpendicular to the drawing surface)). The rubbing directions Ra and Rb are parallel with each other and in the same direction. Between the substrates 11a and 11b, a chiral smectic liquid crystal 15 is disposed. The spacing between the substrates 11a and 11b is set to be sufficiently small (e.g., 0.1–3 microns) as to suppress the formation of a helical alignment structure of the chiral smectic liquid crystal 15, so that the chiral smectic liquid crystal is in bistable orientation states. The abovementioned sufficiently small spacing is held by spacer beads 16 (silica beads or alumina beads). The resultant cell structure is sandwiched between a polarizer 17a (polarizer on the backlight side) and an analyzer 17b (polarizer on the display side) disposed in right-angle cross nicols. As described above, the chiral smectic liquid crystal in this instance is composed of plural molecular Layers each comprising a plurality of liquid crystal molecules and disposed perpendicularly to the substrates. The plurality of molecular layers are uniformly aligned so as to provide a common normal substantially in alignment with the rubbing axis. As a result, bistable or multi-stable orientation states are developed.

FIG. 2 is a schematic perspective view illustrating a laminar structure of a liquid crystal 21 in chiral smectic C phase. Referring to FIG. 2, the liquid crystal 21 in chiral smectic C phase comprises plural molecular layers 22 standing against the substrate 11a (11b) so as to provide a single layer normal 23 to the molecular layers 22. The normal 23 is generally in parallel with the rubbing directions Ra and Rb. Each molecular layer 22 is composed of a plurality of liquid crystal molecules 24 in parallel with or pre-tilted with respect to the substrate 11a (11b).

The liquid crystal 21 in chiral smectic C phase shown in FIG. 2 is disposed between a pair of substrates 11a and 11b spaced apart from each other with a spacing sufficiently small (e.g., 0.5–5.0 microns) to suppress the formation of a helical alignment structure of the Liquid crystal, thereby developing two or more stable orientation states of liquid crystal molecules 24 in the absence of an electric field.

Figure 12:
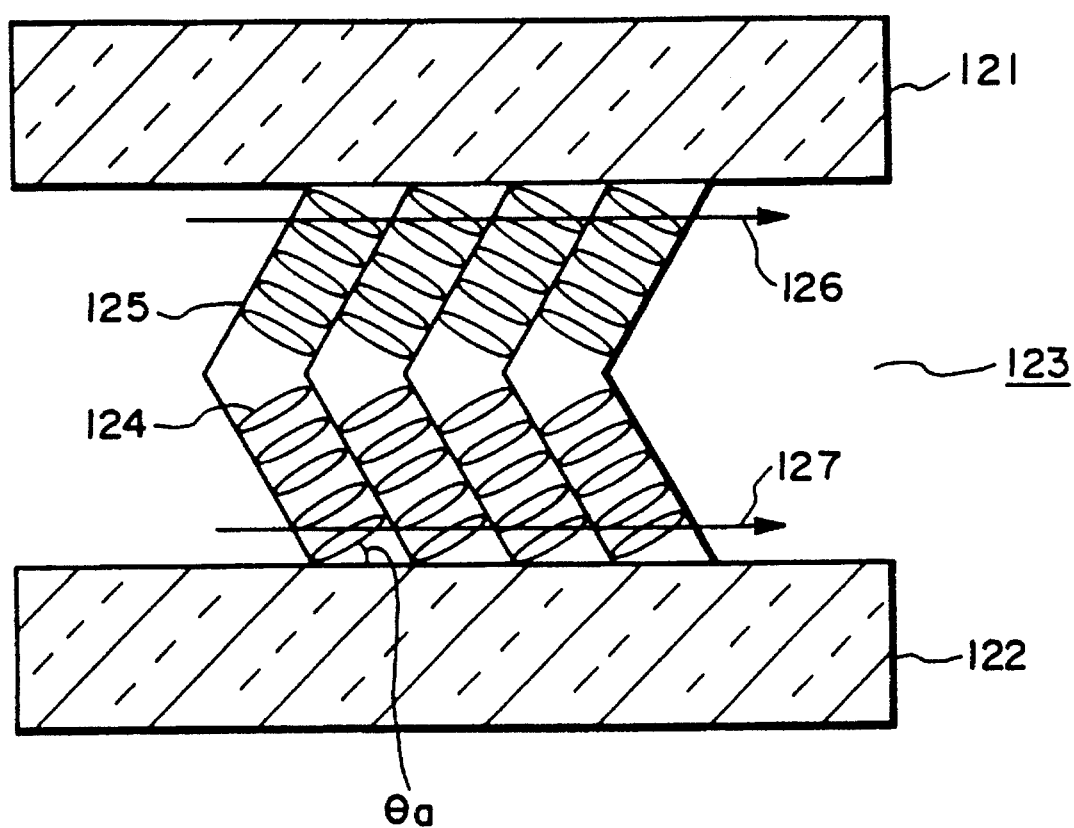
FIG. 12 is a cross-sectional view illustrating the alignment of the liquid crystal apparatus according to the present invention.

The ferroelectric liquid crystal used in the present invention may be aligned to form a chevron structure as shown in FIG. 12 which provides an excellent bright state under cross nicols, thus providing a sufficient contrast. Referring to FIG. 12 which is a cross-sectional view showing an alignment state of a ferroelectric liquid crystal 123 disposed between a pair of substrates 121 and 122, the liquid crystal 123 forms a plurality of layers 125 each comprising plural liquid crystal molecules 124. The layers 125 are aligned in parallel with each other in one direction but each layer 125 is bent or folded. In this instance, each liquid crystal molecule contacting the substrate 121 or 122 may preferably be inclined to have a pre-tilt angle $\theta_a$ of at least 5 degrees, further preferably 10–30 degrees. Such an alignment state may preferably be provided by rubbing the substrates 121 and 122 in the same direction of 126 and 127.

Figure 3B:
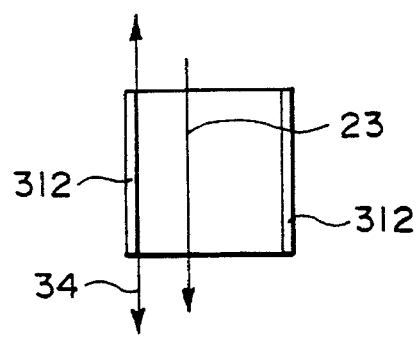

FIGS. 3A and 3B illustrate a liquid crystal apparatus according to the present invention. Referring to FIG. 3A, the liquid crystal apparatus comprises a support structure 31 which is formed of a rigid body of, e.g., aluminum, its alloy or plastic and in turn comprises a base 311 and side supports 312. The base 311 has substantially the same size as that of the panel 1 held thereabove. Each side support 312 may have a width on the order of 1 cm–5 cm. On the upper surface of each side support 312, a rubber sheet 32 has been applied.

The liquid crystal panel 1 has the abovementioned sectional structure shown in FIG. 1 in which a liquid crystal 21 in chiral smectic C phase shown in FIG. 2 is contained.

FIG. 3B is a schematic plan view of the apparatus shown in FIG. 3A. Referring to FIG. 3B, the liquid crystal panel 1 is so disposed that the normal 23 to the molecular layers 22 is in parallel with the fixing axes of the side supports 312 to provide an intersection angle $\theta_1=0$ between the fixing axis 34 and the normal 23.

In the apparatus of the present invention shown in FIG. 3A, both sides of the liquid crystal panel 1 are placed on the side supports 312 and fixed thereat by fixing means including ordinary screws 33 and tooling members 35. On the liquid crystal panel 1 side of each tooling member 35, a rubber sheet 36 may be attached so as to prevent breakage of the liquid crystal panel 1 at the time of the fixing operation.

FIGS. 4A and 4B show another apparatus according to the present invention which is identical to the one shown in FIGS. 3A and 3B except that the angle $\theta_1$ is 25 degrees.

FIGS. 5A and 5B show an apparatus outside the present invention which is identical to the one shown in FIGS. 3A and 3B except that the angle $\theta_1$ is 90 degrees. FIGS. 6A and 6B show an apparatus outside the present invention which is identical to the one shown in FIGS. 3A and 3B except that the angle $\theta_1$ is 65 degrees.

Figure 7:
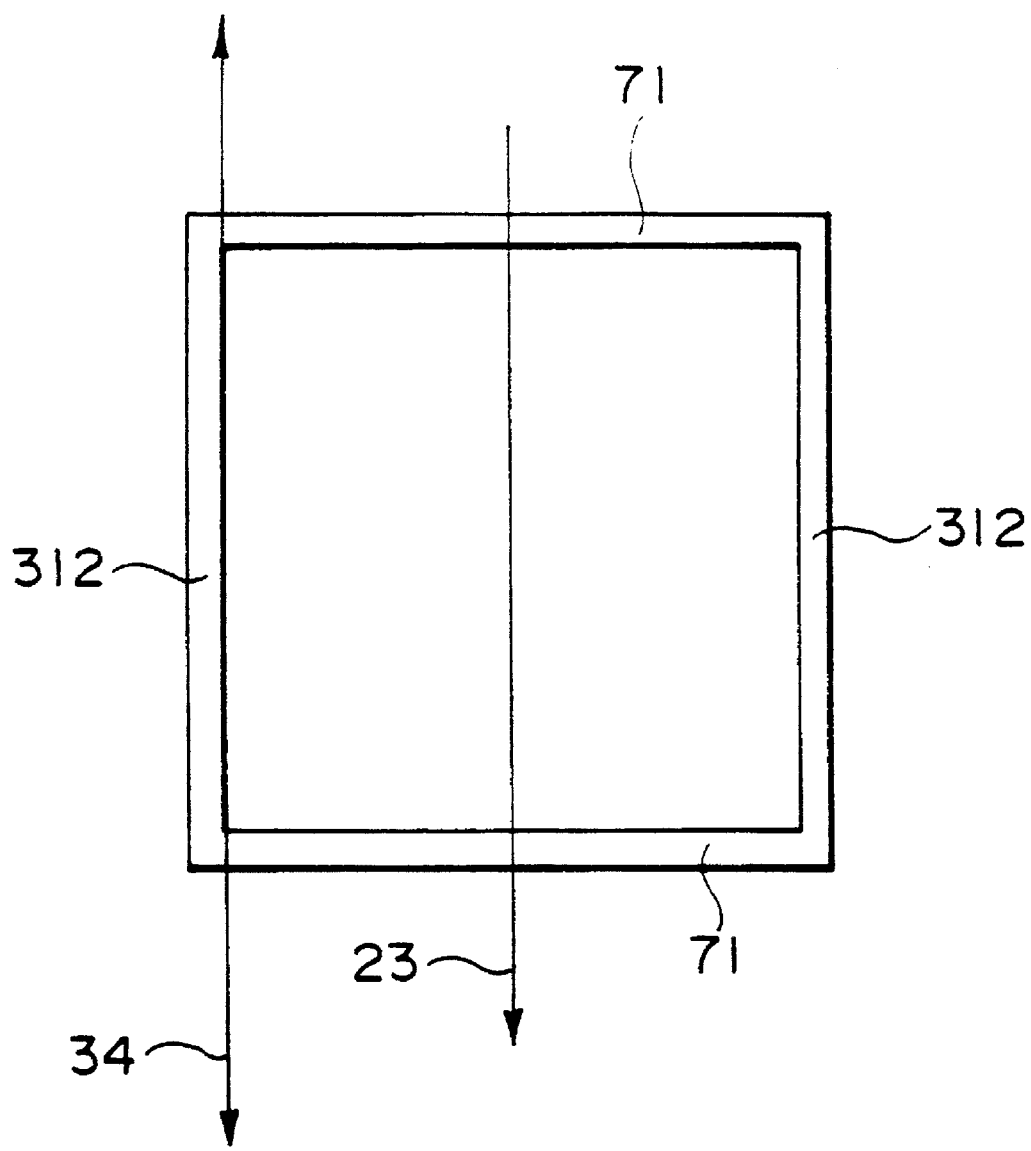
FIG. 7 is a plan view of another apparatus outside the present invention.

FIG. 7 shows an apparatus outside the present invention which is identical to the one shown in FIGS. 3A and 3B except that an additional pair of side supports 71 are provided perpendicularly to the side supports 312 so as to fix the liquid crystal panel 1 on four sides.

As will be described in Examples appearing hereinafter, we tested the liquid crystal apparatus shown in FIGS. 3–7 by a series of impact durability tests wherein each apparatus was subject to dropping impacts increasing from 10G at an increment of 5G by means of a dropping durability tester (trade name: "DT-50", mfd. by Yoshida Seiki K. K.).

Figure 9A:
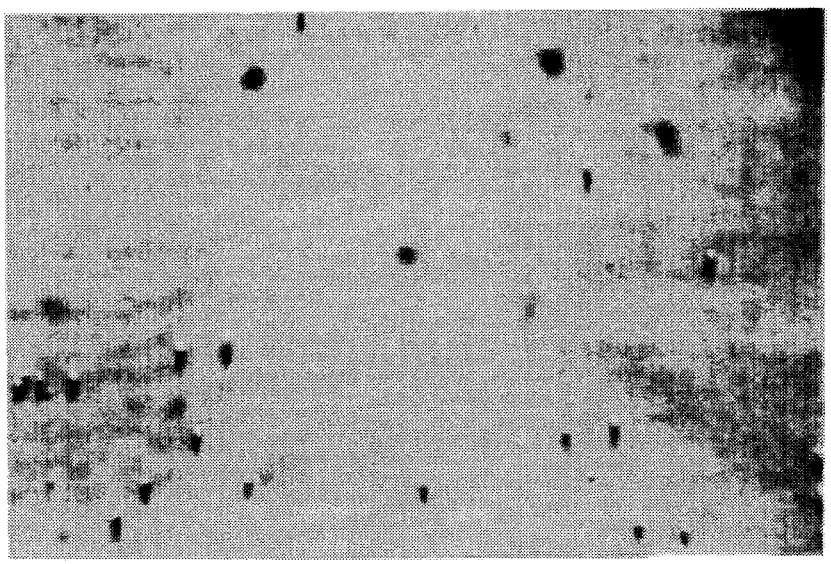
FIGS. 9A and 9B are microscopic photographs (x200) showing a normal alignment texture and a sanded texture, respectively.
Figure 9B:
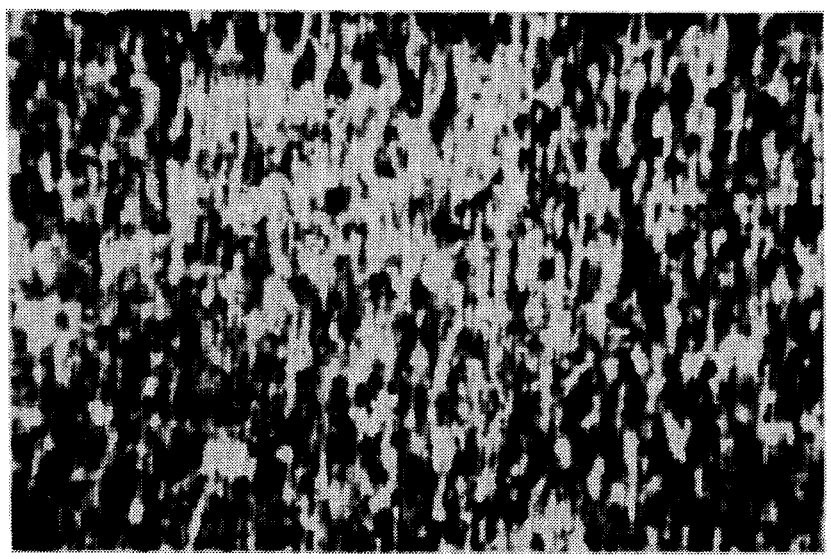

As a result, the apparatus shown in FIGS. 5A and 5B caused a deterioration in alignment of liquid crystal (sanded texture) at a dropping impact of 15G. FIG. 9A is a microscopic photograph (x200) of the alignment state of the liquid crystal in the liquid crystal panel 1 of the apparatus shown in FIGS. 5A and 5B before the impact test and FIG. 9B is a microscopic photograph (x200) of the alignment state after the application of a dropping impact of 15G showing a sanded texture. Further, when the apparatus shown in FIGS. 6 and 7 were subjected to the same dropping impact test, the apparatus respectively caused a sanded texture as shown in FIG. 9B after application of a dropping impact of 15G.

On the other hand, the liquid crystal apparatus shown in FIGS. 3A and 3B was also subjected to the same dropping impact test, whereby the apparatus did not result in a sanded texture as shown in FIG. 9B even after application of a dropping impact of 90G.

Hereinafter, the present invention will be explained more specifically with reference to Examples.

EXAMPLE 1

A pair of glass plates each in a size of 200 mm×200 mm and having a thickness of 1.1 mm were provided, and stripe electrodes (12a, 12b shown in FIG. 1) were respectively formed on the glass plates. On the substrates, 1000 Å-thick low-resistivity connection lines (13a, 13b shown in FIG. 1) of molybdenum were provided so as to stride between the ITO electrodes and pixels. Further, 500 Å-thick $SiO_2$ layers were formed thereon by sputtering as layers for preventing short circuit between the electrodes on both substrates. Each substrate was further coated with a 0.1%-aminosilane solution in IPA (isopropanol) by means of a spinner rotating at 2000 rpm for 15 seconds, followed by heating at 150° C., and then coated with polyimide-forming solution ("SP-510", available from Toray K. K.) diluted to 2% with a 2:1 mixture of NMP and n-butylcellulose by means of a spinner rotating at 3000 rpm for 30 min. The coating was then heat-cured at 300° C. for 1 hour to form a 200 Å-thick polyimide alignment film (14a or 14b in FIG. 1).

One (11a in FIG. 1) of the two glass substrates thus treated was subjected to rubbing on the polyimide film (14a) after the curing in the direction of the arrow Ra, and the other substrate (11b in FIG. 1) was subjected to rubbing in the direction of the arrow Rb.

Then, alumina beads (16 in FIG. 1) having an average particle size of about 1.5 micron were dispersed on one of the glass substrates, and the other substrate was superposed thereon, so that the rubbing directions on the substrates were parallel with each other. Thus, the two substrates were bonded to each other to form a blank cell having a cell gap of about 1.5 microns as measured by a Bereck compensator (measurement based on phase difference). The cell was filled under vacuum with a ferroelectric liquid crystal ("CS-1014" (trade name) available from Chisso K. K.) heated into isotropic phase and then gradually cooled at a rate of 0.5° C./hour to 25° C. whereby the liquid crystal was aligned. The experiment was thereafter conducted at 25° C. The liquid crystal "CS-1014" (trade name) showed the following phase transition series.

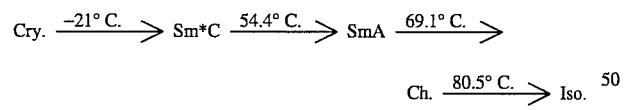

(SmA:smectic A phase, Ch.:cholesteric phase, Iso.:isotropic phase)

The liquid crystal cell thus obtained was observed through right-angle cross nicols, whereby a defect-free monodomain of chiral smectic C phase in helical structure was found to be formed.

Further, the liquid crystal device (cell or panel) was held at 60° C. to assume an alignment state in SmA phase and was observed through a polarizing microscope with right-angle cross nicol polarizers to measure the alignment direction of the liquid crystal molecular layers by utilizing a phenomenon that the liquid crystal molecules are aligned perpendicular to the layers. More specifically, the right angle cross nicols were rotated with respect to the liquid crystal cell to find out the darkest position where the optical axis of one of the polarizers coincided with the layer normal 23 of the molecular layers 22.

The liquid crystal panel (cell) thus prepared was fixed to a support at two sides thereof as shown in FIGS. 3A an 3B having an axis 34 forming an angle $\theta_1 = 0$ with the layer normal 23 in Sm*C phase to form a liquid crystal device unit (apparatus) as shown in FIG. 3A.

The liquid crystal device unit was subjected to the above-mentioned dropping impact test, whereby alignment deterioration (sanded texture) occurred at a dropping impact of 100G but no alignment deterioration was observed at all at a dropping impact of 90G.

EXAMPLE 2

A liquid crystal panel (cell) was prepared in the same manner as in Example 1 except that the rubbing direction was inclined by 25 degrees. Then, the liquid crystal panel was held at 60° C. to measure the direction of the molecular layer normal 23.

Then, the thus prepared liquid crystal was fixed to a support at two sides thereof as shown in FIGS. 4A and 4B having an axis forming an angle $\theta_1=25$ degrees with the layer normal 23 in Sm*C phase to form a liquid crystal device unit.

The liquid crystal device unit was subjected to the above-mentioned dropping impact test, whereby alignment deterioration (sanded texture) occurred at a dropping impact of 50G but no alignment deterioration was observed at a dropping impact of 40G.

COMPARATIVE EXAMPLE 1

A liquid crystal device unit was prepared in the same manner as in Example 1 except that the liquid crystal panel was fixed to a support at two sides thereof as shown in FIGS. 5A and 5B forming an angle $\theta_1=90$ degrees with the layer normal 23 in SmC* phase.

When the liquid crystal device unit was subjected to the above-mentioned dropping impact test, alignment deterioration (sanded texture) occurred at a dropping impact of 15G.

COMPARATIVE EXAMPLE 2

A liquid crystal panel (cell) was prepared in the same manner as in Example 1 except that the rubbing direction was inclined by 65 degrees. Then, the liquid crystal panel was held at 60° C. to measure the direction of the molecular layer normal 23.

Then, the thus prepared liquid crystal panel was fixed to a support at two sides thereof as shown in FIGS. 6A and 6B having an axis forming an angle $\theta_1=65$ degrees with the layer normal 23 in Sm*C phase to form a liquid crystal device unit.

The liquid crystal device unit was subjected to the above-mentioned dropping impact test, whereby alignment deterioration (sanded texture) occurred at a dropping impact of 15G.

COMPARATIVE EXAMPLE 3

All the periphery (4 sides) of the liquid crystal panel prepared in Example 1 was fixed to a support as shown in FIG. 7.

The resultant liquid crystal device unit caused a sanded texture at a dropping impact of 15G.

Figure 8A:
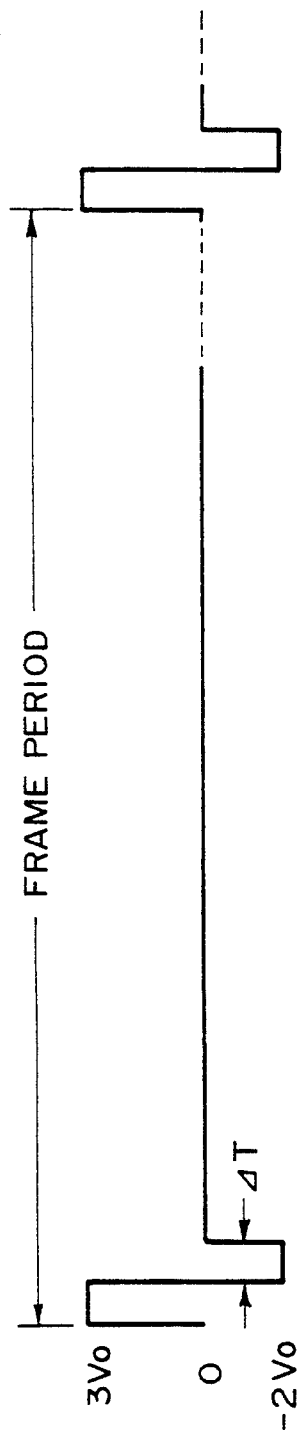
FIGS. 8A, 8B and 8C are time charts showing a set of driving waveforms used in a multiplex drive scheme used in the present invention.
Figure 8B:
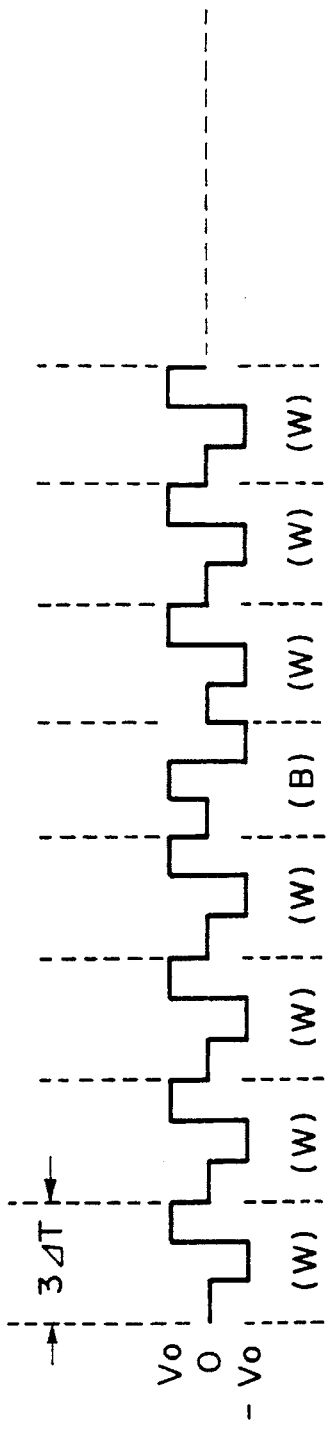
Figure 8C:
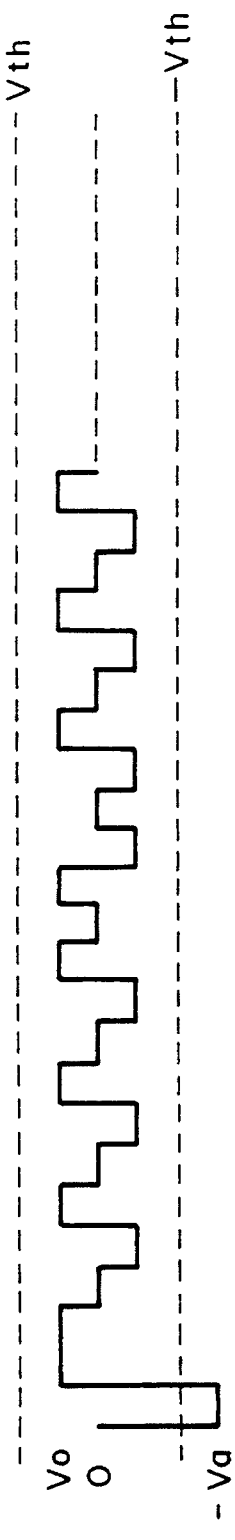

Five units each of the apparatus identical to those prepared in Examples 1 and 2 and Comparative Examples 1–3 were respectively provided with a dropping impact of 40G, and then subjected to a display operation using a set of driving waveforms as shown in FIGS. 8A, 8B and 8C, wherein FIG. 8A shows a time-serial waveform of a scanning signal applied to a scanning line; FIG. 8B shows a time-serial waveform of data signals applied to a data line including "W" (white) data signal and "B" (black) data signal; and FIG. 8C shows a voltage waveform applied to a pixel formed at the intersection of the scanning line and the data line. The display operation was performed under the conditions of $\Delta T=50$ μsec, and $Va=3V_0=21$ volts.

As a result, the device units according to the types of Examples 1 and 2 showed a good display operation, whereas those according to the types of Comparative Examples 1–3 could not perform a display operation.

In the apparatus of the present invention, the intersection angle $\theta_1$ may be effectively in the range of 0–25 degrees, but more effectively in the range of 0–15 degrees.

Figure 10:
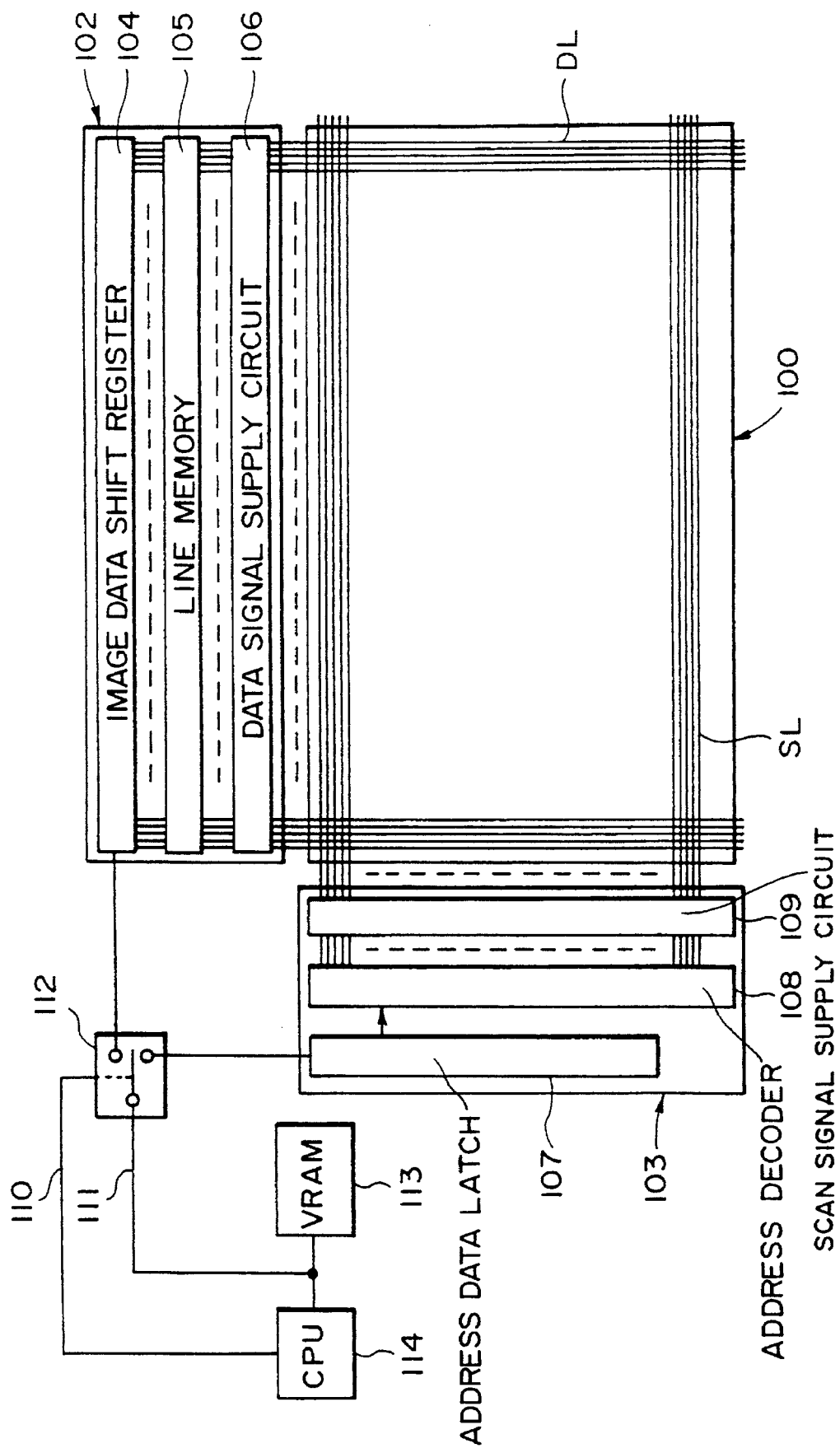
FIG. 10 is a block diagram of an apparatus according to the present invention.
Figure 11:
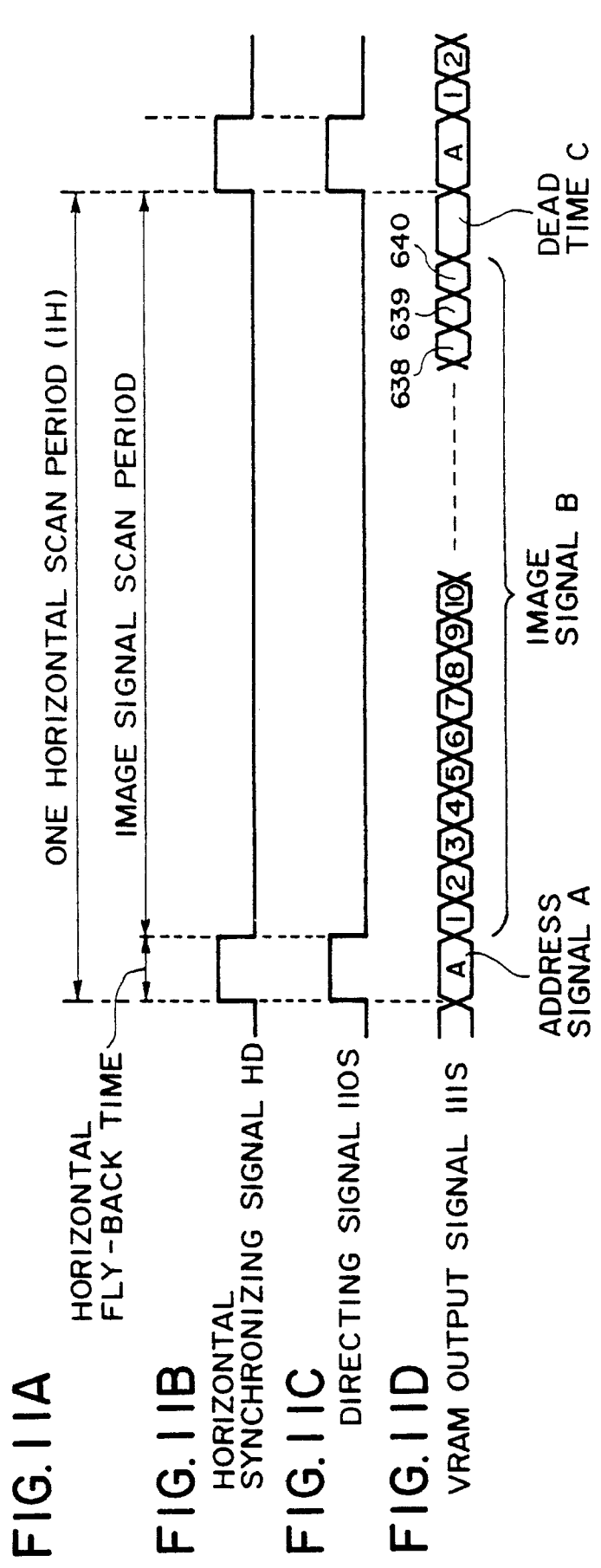
FIGS. 11A, 11B, 11C and 11D are time charts illustrating data communication between a panel and a drive circuit.

FIG. 10 illustrates an outline of a display apparatus including a display panel 100 and peripheral circuits used in the present invention. The display panel 100 comprises data electrodes DL (e.g., 640 lines), scanning electrodes SL (e.g., 400 lines) and a chiral smectic liquid crystal hermetically disposed therebetween. The data electrodes DL are supplied with data signals from a data electrode drive circuit 102, and the scanning electrodes SL are supplied with data signals from a scanning electrode drive circuit 103. The data electrode drive circuit 102 includes a shift register 104 receiving one line of image signal data shown in FIGS. 11A, 11B, 11C and 11D serially supplied to be displayed on the display panel 100; a line memory 105 receiving in parallel and memorizing the serial data for one line sent to the shift register 104; and a data signal supply circuit 106 for supplying data signals to the respective data electrodes DL according to the data for one line memorized in the line memory 105.

The scanning electrode drive circuit 103 includes an address data latch 107 for latching an address signal for designating one of the scanning electrodes SL; an address decoder 108 for selecting one of the scanning electrodes SL according to the address signal latched by the address data latch 107; and a scanning signal supply circuit 109 for supplying a scanning selection signal to one scanning electrode SL selected by the address decoder 108.

The display apparatus further includes an image memory VRAM 113 for memorizing image data for each of the bits corresponding to the pixels formed at the intersection of the data electrodes DL and the scanning electrodes SL on the display panel 100; a changeover directing signal line 110 for supplying a horizontal synchronizing signal; an address data line 111 for transferring output signals (VRAM output signals shown in FIG. 11D) from the image memory (VRAM) 113 to the display panel 100; a changeover switch 112 for determining either the shift register 104 or the address data latch 107 to which the VRAM output signals from the address data line 111 are to be sent depending on the signal (horizontal synchronizing signal) from the changeover directing signal line 110. According to the present invention, as shown in FIG. 11D, the VRAM output signals include an address signal A for addressing a scanning electrode to which a scanning selection signal is to be sent, and image signals B for designating data signals to be supplied to the data electrodes for the respective data electrodes. By the action of the switch 112, the address signal A is transferred to the address data latch 107, and the image signals B are set to the shift register 104.

The display apparatus further includes a CPU 114 by which the outputs from the image memory 113 are controlled. Particularly when partial rewriting data are generated in the image memory 114, the CPU 114 reads out the order of scanning electrodes to be addressed from the partial rewriting data corresponding to the rewriting liens and supplies the address signal A thereto.

Next, a signal transfer system by using the above display apparatus will be explained.

FIGS. 11, 11B, 11C and 11D are time charts showing a directing signal 110S appearing on the changeover directing signal line 110 and VRAM output signals 111S appearing on the address data line 111.

When the directing signal 110S is at the high level, the VRAM output signal 111S comprises an address signal A for designating one of the scanning electrodes SL. Thereafter, when the directing signal 110S is at the low level, the address data line 111 serially transfers VRAM output signals 111S which are image signals B serially outputted in the image signal scanning period, i.e., data signals each corresponding to one of the data electrodes DL. Before the time when the changeover directing signal 111S is at the high level again, a period called "dead time C" is placed, which is a very short time allotted as a process time for an external transfer apparatus.

When the directing signal 110S is at the high level, the switch 112 turns the address data line 111 over to the address data latch 107 side. As a result, the address signal A in the VRAM output signals 111S is latched by the address data latch 107, and a scanning selection signal is supplied to one of the scanning electrodes SL through the address decoder 108 and the scanning signal supply circuit 109.

Then, when the directing signal 110S is at the low level, the switch 112 turns the address data line 111 over to the shift register 104 side. As a result, the image signals in the VRAM output signals 111S are supplied to the shift register 104 and sent through the line memory 105 to the data signal supply circuit 106, from which a white data signal and a black data signal are supplied to the respective data electrodes DL selectively depending on given data. In other words, an address signal A sent to the scanning electrode drive circuit 103 and serial image signals B sent to the data electrode drive circuit 102 may be supplied to one address data line 111, so that the address signal A for addressing a selected scanning electrode is conveyed first, and subsequently thereafter the image signals B corresponding to the selected scanning electrode may be sent to the data electrodes. A similar control may be repeated for the subsequent second, third, . . . , scanning electrodes, whereby one picture may be formed.

In a preferred embodiment of the present invention, when a part of a already formed display picture is rewritten (e.g., for correction of a character or a multi-window display on a display picture), the above-mentioned address signal A may be controlled by the CPU so that the address signal A is supplied to only scanning electrodes in the partially rewritten region. Further, such a partial rewriting scheme by applying a scanning selection signal only to a selected scanning electrode may also be applicable to a cursor display or mouse display on a display picture.

Referring again to FIGS. 11A, 11B, 11C and 11D, the directing signal 110S is synchronized with the horizontal synchronizing signal HD, and the high level of 110S is allotted to the horizontal fly-back time and the low level thereof is allotted to the image signal scanning period, with respect to time. Further, the image data 1, 2, 3, 4, . . . , 640 serially supplied in one horizontal scanning period correspond to image data of data signals sent to the first, second, third, fourth, . . . , 640-th data electrodes, respectively.

What is claimed is:

1. A process for assembling a chiral smectic liquid crystal panel with a housing therefor, comprising the steps of:

(a) forming a smectic A liquid crystal between a pair of substrates each subjected to rubbing in one direction so that said smectic A liquid crystal forms plural molecular layers organized by plural molecules and having a common layer normal thereto and each smectic A liquid crystal molecule is oriented in a direction perpendicular to said molecular layers thereof so that the smectic A liquid crystal provides an optical axis coinciding with the common layer normal;

(b) forming a chiral smectic liquid crystal by cooling the smectic A liquid crystal to a chiral smectic C phase, in which the liquid crystal molecules are disposed in plural layers having a layer normal substantially coinciding with said one direction of rubbing, thereby providing a chiral smectic liquid crystal panel;

(c) disposing two elongated supporting members constituting a housing in parallel with each other to have a common longitudinal direction; and (d) disposing the two elongated supporting members along sides of the substrates thereby to support the chiral smectic liquid crystal panel, so that the longitudinal direction of the two elongated supporting members forms an intersection angel $\theta_1$ in a range of 0°–25° with said common layer normal to the chiral smectic liquid crystal.

2. A process according to claim 1, wherein the intersection angle $\theta_1$ is in a range of 0°–15°.

3. A process according to claim 1, wherein the in intersection angle $\theta_1$ is 0°.

4. A process according to claim 1, wherein both of said pair of substrates are respectively provided with an alignment axis.

5. A process according to claim 4, wherein the alignment axis is provided by rubbing.

6. A process according to claim 1, wherein both of said pair of substrates are respectively provided with an alignment axis in the same direction.

7. A process according to claim 6, wherein the alignment axis is provided by rubbing.

* * * * *

UNITED STATES PATENT AND TRADEMARK OFFICE
CERTIFICATE OF CORRECTION

PATENT NO. : 5,523,872
DATED : June 4, 1996
INVENTOR(S) : YUKIO HANYU ET AL.

It is certified that error appears in the above-identified patent and that said Letters Patent is hereby corrected as shown below:

COLUMN 3

Line 12, "films 14" should read --films 14a--.
Line 34, "Layers" should read --layers--.
Line 54, "Liquid" should read --liquid--.

COLUMN 6

Line 4, "an" should read --and--.

COLUMN 8

Line 6, "memory 114," should read --memory 113,--.
Line 12, "FIGS. 11," should read --FIGS. 11A,--.
Line 54, "a already" should read --an already--.

UNITED STATES PATENT AND TRADEMARK OFFICE
CERTIFICATE OF CORRECTION

PATENT NO. : 5,523,872

DATED : June 4, 1996

INVENTOR(S) : YUKIO HANYU ET AL.

It is certified that error appears in the above-identified patent and that said Letters Patent is hereby corrected as shown below:

COLUMN 10

Line 5, "angel $\theta_1$" should read --angle $\theta_1$--.
Line 11, "in" should be deleted.

Signed and Sealed this

Twelfth Day of November, 1996

Attest:

BRUCE LEHMAN

Attesting Officer    Commissioner of Patents and Trademarks